S. E. KURTZ.
CONDUIT COUPLING AND PROCESS FOR MAKING SAME.
APPLICATION FILED FEB. 9, 1914.
1,251,973.
Patented Jan. 1, 1918.
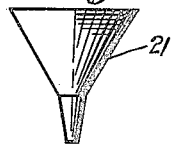
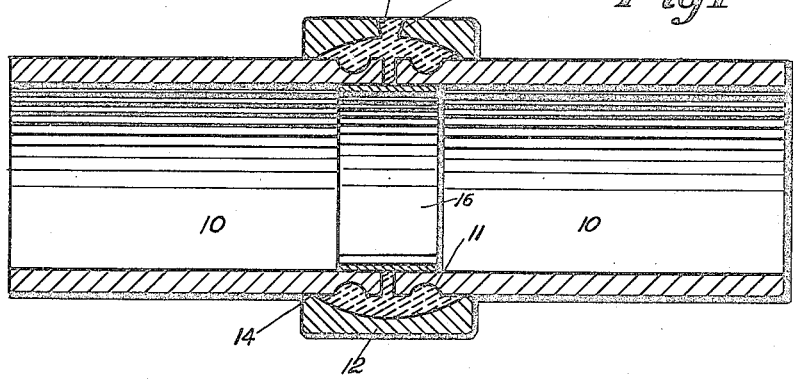
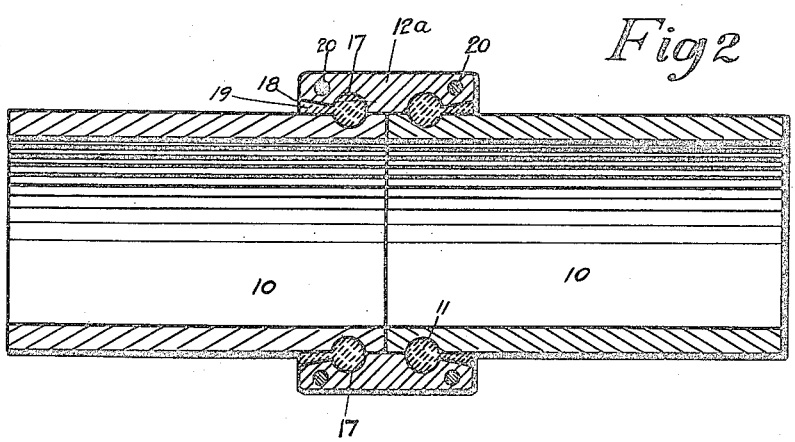
Witnesses
Inventor
Samuel E. Kurtz

UNITED STATES PATENT OFFICE.

SAMUEL E. KURTZ, OF SAC CITY, IOWA.

CONDUIT-COUPLING AND PROCESS FOR MAKING SAME.

1,251,973.   Specification of Letters Patent.   Patented Jan. 1, 1918.

Application filed February 9, 1914. Serial No. 817,629.

*To all whom it may concern:*

Be it known that I, SAMUEL E. KURTZ, a citizen of the United States, residing at Sac City, in the county of Sac and State of Iowa, have invented a certain new and useful Conduit-Coupling and Process for Making Same, of which the following is a specification.

The object of my invention is to provide a conduit coupling of simple, durable and inexpensive construction.

More particularly, it is my object to provide means for forming a tight joint between tile or the like of ordinary construction or of the construction changed from that of the ordinary tile in only simple details, the joint being in the nature of the bell head type.

A further object is to provide such a joint so constructed and arranged that the joint may be closed with cement when the tile is laid.

Still a further object is to provide a new and improved process for making such a coupling.

My invention consists in certain details, in the construction, arrangement and combination of the various parts of the device, whereby the objects contemplated are attained, as hereinafter more fully set forth, pointed out in my claims and illustrated in the accompanying drawings, in which:

Figure 1 shows a vertical, longitudinal, sectional view through two cement tile connected by an improved joint, embodying my invention.

Fig. 2 shows a modified form of the same, and

Fig. 3 shows a side elevation of a funnel.

In the accompanying drawings, I have used the reference numeral 10 to indicate a section of cement tile which may be of ordinary construction excepting near the ends thereof the tile sections 10 are provided with circumferential, annular grooves 11. The pipe sections 10 are placed end to end in alinement with each other with their ends as nearly abutting against each other as may be desired.

For completing my improved joint, I provide a larger pipe 12 of sufficient diameter to encircle the pipe sections 10. The pipe 12 is comparatively short and on the inside is concave in cross section from end to end, as clearly shown in Fig. 1.

At some point, the pipe 12 is provided with a hole 13 extending through it. The pipe 12 is inserted over the two adjacent pipe or tile sections 10 to cover the joint between them. The pipe 12 is provided with a flat shoulder 14 on its inner surface at each end to bear evenly against the outer walls of the tile sections 10. In other words, the concave portion of the flat surface of the pipe 12 does not extend quite to the ends of the pipe.

In the completing of the joint, soft cement is poured through the hole 13 and fills the space between the concave portion of the pipe 12 and the outer surfaces of the tile 10, including the grooves 11 forming a solid cement joint. In many cases the adjacent ends of the pipe or tile sections 10 do not fit closely together owing to imperfections in the tile because of laying the tile on a curve or for other reasons. In such cases, a collapsible inner form 16 of ordinary construction may be placed on the inside of the tile sections 10 along the joint between the two so that the soft cement 15 may fill the space between the tile sections and leave a smooth, uniform inner surface. When the soft cement has set, the form 16 may be removed. When the joint is completed, it will be noted that the pipe 12 is firmly locked against longitudinal movement on the tile sections 10.

In Fig. 2 I have shown a somewhat modified form of my improved joint. The tile sections 10 are of the same construction, as those already referred to. The encircling pipe 12ª is provided with two internal annular grooves 17, spaced from each other and designed to register with the grooves arranged to register with the grooves 11 of the pipe sections 10. The interior surface of the body of the pipe 12ª forms a bearing which covers the joint between the tile sections 10 and engages the outer surfaces of said tile sections on each side of said joint. The inner surface of the pipe 12ª is preferably cut away from the grooves 17 to the ends of the pipe section 12ª at 18, as shown in Fig. 2. When the pipe 12ª is installed in position, soft cement may be forced into the space between the grooves 17 and 11 and into the space 18 for forming a tight joint. The larger pipes may be provided with reinforcing rings 20, if desired.

It will be understood that the parts of my improved conduit coupling may be made of any suitable material. When the larger pipe is made of cement it may be manufactured and the joint completed much more cheaply than a joint made with bell head tile. The manufacture of bell head tile requires the installation of expensive machinery while my improved conduit couplings may be made with the equipment of any ordinary small factory.

It will be seen that this joint has all the advantages of the ordinary bell head coupling. If desired, the pipe 12 may be laid in a ditch or the like with the hole 13 upward and the funnel 21 may be used for pouring in the slush cement, and when so used may be filled so as to pour the cement under pressure through the opening 13. It will be seen that with either form of my improved joint, the outer pipe may be mounted on one section of the pipe 10, making practically a bell head tile. This may be done before the tile is laid if preferred. The bell head construction is more easily made with the form shown in Fig. 2. It will be seen that with either form of my device, a strong water tight joint is made.

It will also be noted that where my form of joint is used, not only are all the advantages of the bell head joint construction secured, but the parts are much more even for storage and transportation than are bell head tile.

It will be understood that the process of completing the joint hereinbefore described may be varied in a number of particulars, for instance, the joint may be completed entirely with slush concrete and the use of detachable molds.

It will be understood that changes may be made in the details of the construction of my conduit coupling and in some of the details of the process of completing it and it is my intention to cover by this application any such changes which may be included within the scope of the following claims.

I claim as my invention:

1. In a device of the class described, a pair of pipes of substantially the same shape arranged in alinement with one end of each pipe adjacent to one end of the other pipe, the ends of the pipes, which are adjacent having annular rounded grooves formed in their outer surfaces, a cylindrical retaining member having an end of each pipe received therein, the ends of said cylindrical member being of such size as to fit against the outer surfaces of the pipes, the central inner portion of the retaining member having an annular groove adapted to receive slush concrete, said retaining member also having a passage from the groove to the outer surface, and a collapsible form adapted to be received within the pipes with its outer surface against the inner surface of the pipes whereby when slush concrete is poured between the ends of the pipes it may be retained in place until set to form a smooth inner surface at the point.

2. In a device of the class described, a pair of pipes arranged end to end in alinement and having an annular rounded groove in the outer surface of each of the two adjacent ends, an annular retaining band having its inner end surfaces adapted to fit against the pipes adjacent to the joint and its inner central surface dished to form an annular groove outside of the joint beads of the pipes, a removable form adapted to be received within the pipes adjacent to the joint therebetween whereby slush concrete, which may be poured between the ends of the pipe, may be retained to set with its inner surface alined with the inner surfaces of the pipes, and means for permitting slush concrete to be poured into the grooves within the retaining band and outside the pipes adapted to place the unset concrete when filled under pressure greater than atmospheric pressure.

Des Moines, Iowa, February 5, 1914.

SAMUEL E. KURTZ.

Witnesses:
S. ROBINSON,
M. WALLACE.